United States Patent [19]
Fujii et al.

[11] Patent Number: 4,885,791
[45] Date of Patent: Dec. 5, 1989

[54] APPARATUS FOR SPEECH RECOGNITION

[75] Inventors: Satoru Fujii; Katsuyuki Niyada, both of Sagamihara; Shuji Morii, Tokyo; Taisuke Watanabe, Sagamihara, all of Japan

[73] Assignee: Matsushita Electric Industrial Co., Ltd., Osaka, Japan

[21] Appl. No.: 920,785

[22] Filed: Oct. 20, 1986

[30] Foreign Application Priority Data

Oct. 18, 1985 [JP] Japan .................................. 60-233644
Nov. 20, 1985 [JP] Japan .................................. 60-260052
Dec. 5, 1985 [JP] Japan .................................. 60-273741

[51] Int. Cl.⁴ .............................................. G10L 1/00
[52] U.S. Cl. ...................................... 381/43; 364/513.5
[58] Field of Search ................................... 381/29–50; 364/513, 513.5

[56] References Cited

U.S. PATENT DOCUMENTS

| | | | |
|---|---|---|---|
| 4,059,725 | 11/1977 | Sakoe | 381/43 X |
| 4,282,403 | 8/1981 | Sakoe | 381/43 X |
| 4,319,221 | 3/1982 | Sakoe | 381/43 X |
| 4,467,437 | 8/1984 | Tsuruta et al. | 381/43 X |
| 4,571,697 | 2/1986 | Watanabe | 381/43 X |
| 4,590,605 | 5/1986 | Hataoka et al. | 381/43 |
| 4,672,668 | 6/1987 | Kitazume et al. | 381/43 |

Primary Examiner—Patrick R. Salce
Assistant Examiner—Emanuel Todd Voeltz
Attorney, Agent, or Firm—Lowe, Price, LeBlanc, Becker & Shur

[57] ABSTRACT

Disclosed is a speech recognition apparatus comprising: a speech analysis portion for extracting parameters necessary for determination of spoken words; a speech period detecting portion for extracting one or more combinations of speech periods using the parameters; and a structure analysis portion for detecting feature points indicative of phoneme structure of each word and for determining a word through computation of similarity to proposed words in accordance with the presence and absence of the feature points. Therefore, erroneous recognition due to noise introduction or the like can be reduced by detecting one or more combinations of proposed speech periods by the speech period detecting portion. By extracting only necessary number of extracting points, which contribute to the distinguishment between words, with reference to analysis procedure provided for each word, the sharpness of determination is bettered. More stable operation than conventional apparatus has been achieved in connection with time base expansion/compression. Small numbers of parameters obtained through speech analysis are used to reduce the amount of computation, while the above-mentioned parameters are stable against difference in phonemes due to difference in speakers.

11 Claims, 11 Drawing Sheets

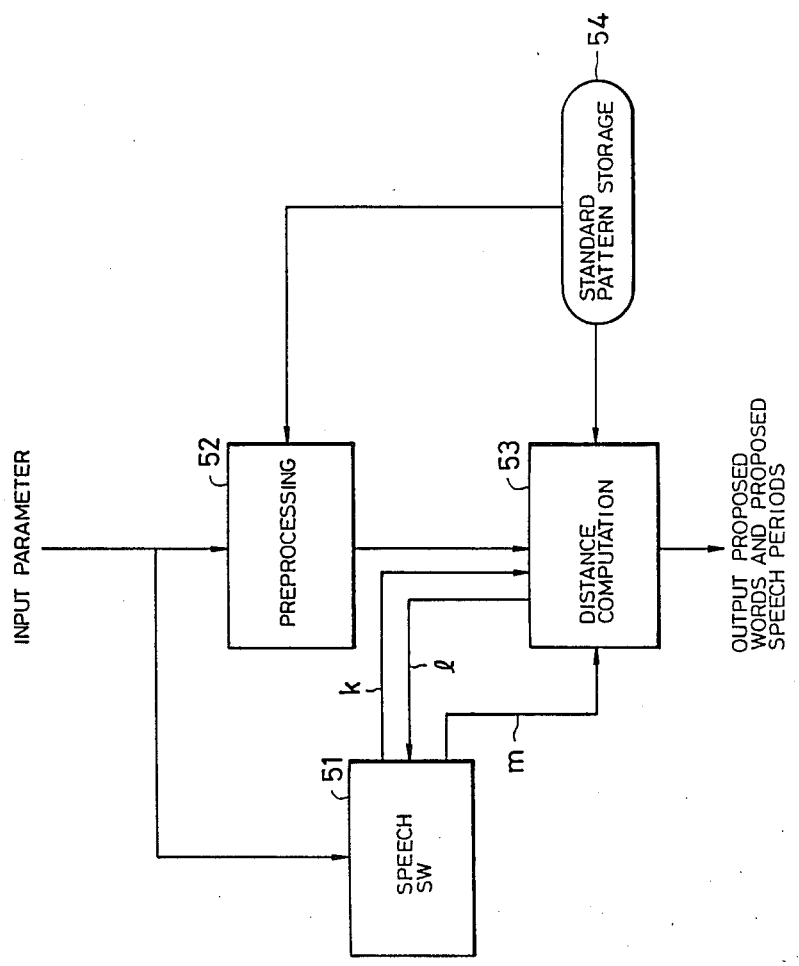
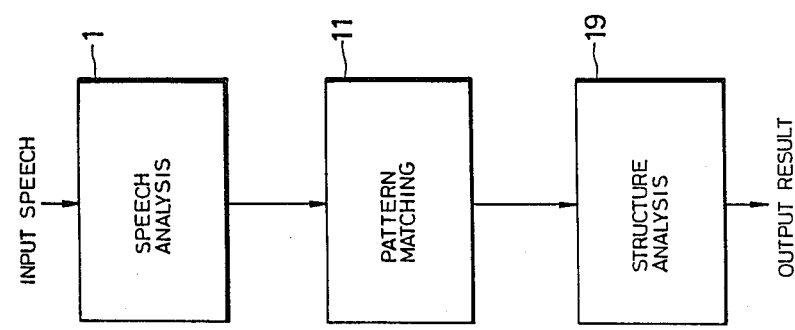

APPARATUS FOR SPEECH RECOGNITION

BACKGROUND OF THE INVENTION

This invention relates to apparatus for automatically recognizing the contents of speech.

A conventional speech recognition apparatus is described in a paper resulting from a large project pattern information processing system study entitled "Speech Recognition System." This is a practical apparatus for recognizing ten or more words of speech transmitted on a telephone line.

A functional block diagram of a computer employed in a conventional manner for speech recognition is shown in FIG. 1. Speech analysis is effected by a speech recognizing portion 1, responsive to a speech input signal. The system includes analyzer 1 having an adaptive equalizer comprising a first order filter with self-correlation analysis for compressing $20^{th}$ order analyzing parameters to $7^{th}$ order feature vectors through K-L conversion. Then, speech period is detected by a speech period detection portion 2 using speech amplitude information. Then time compression is effected by a time compressing portion 3. This is effected for normalizing the variations in speech speed. To this end, an extracting procedure capable of extracting an instant which represents the structure of phoneme of a word is prepared in advance in a word table 4. With reference to such information given for each word, stable extracting points are obtained by determining extracting points. The fifteen extracting points are used in all the words.

Then a projection-image-on-convex portion 5 projects an image of time compressed patterns. To improve separation between categories, i.e. types of words, pattern vectors obtained from the time compression portion 3 are projected on a convex surface. Then distinction functions are computed for different categories by a distinction function computing portion 8. Distinction function data are derived in portion 7 beforehand by computing a segmentary linear distinction function using a number of speech sound samples by a segmentary linear distinction function value computing portion 6 after the operation of the projection-image-on-convex portion 5. The above-mentioned distinction function value computation is effected through multi-stage processing. This is a method of obtaining a distinction function which accurately and finally separates samples after several stages of computation of distinction functions have been repeated using a small number of samples. This method is adopted because the repeating process of linear planning remarkably increases when the matrix becomes very large. Assuming that a segmentary distinction function obtained at each stage is expressed by $Cijl(X)$, a distinction function with respect to class l of a pattern vector X is given by:

$$gl(X) = \min_{j}(\max_{i} Cijl(X)) \quad (1)$$

wherein i indicates a piece of a distinction function; and j indicates a stage.

The result of the distinction function computing portion 8 is fed to portion 9 where a word determination is made and an output derived.

The above-described conventional method suffers from the following problems.

(1) Since the number of extracting points through time compression is common to all the categories, extracting points which do not contribute to the determination are included, resulting in deterioration of sharpness of the determination. In addition, the conventional method is affected by time base expansion and compression to a considerable degree.

(2) A large amount of computation is necessary for deriving the projection image for a convex and distinction function.

(3) Since the feature vectors are obtained through self correlation analysis without using statistical distance measure, the distinction functions may be mismatched due to slight phoneme differences as a function of speakers.

(4) Misrecognition is apt to occur due to errors in speech period detection caused by noise or telephone line variations.

(5) Since speech period detection results from a combination of rules, there are complex combinations to improve accuracy.

SUMMARY OF THE INVENTION

The present invention has been developed in order to remove the above-described drawbacks inherent in the conventional speech recognition apparatus.

It is, therefore, an object of the present invention to provide a new and improved speech recognition apparatus having a small number of operations and capable of stable operation even though there are substantial variations in speakers and sound emission.

Another object of the present invention is to provide a new and improved speech recognition apparatus for handling a small number of words spoken by unspecified speakers such that an error in recognition due to noise or the like is reduced so as to improve recognition rate.

In accordance with the present invention there is provided a speech recognition apparatus comprising: a speech analysis portion responsive to spoken words for extracting parameters necessary for the determination of the spoken words (exemplary of the parameters are outputs of band pass filters of several channels); a speech period detecting portion for extracting one or more combinations of speech periods using the extracted parameters; and a structure analysis portion for detecting feature points indicative of phoneme structure of each word. The indicated phoneme structures enable the spoken word to be detected from one of several proposed words by computing the similarity of features in the proposed words to the presence and absence of feature points in the spoken words. Therefore, erroneous recognition due to noise introduction or the like is reduced by detecting one or more combinations of proposed speech periods by the speech period detecting portion. Furthermore, by extracting only the necessary number of extracting points, which contribute to the distinguishment between words, with reference to analysis procedure provided for each word, in the structure analysis portion, greater sharpness of determination occurs. In addition, more stable operation than conventional apparatus has been achieved in connection with time base expansion/compression. Moreover, since there is a small number of parameters (three channel band power) in the preferred embodiment, the amount of computation is reduced. In addition, the above-mentioned parameters are stable against differences in phonemes due to differences in speakers.

In accordance with the present invention there is also provided a speech recognition apparatus comprising: a speech analysis portion responsive to spoken words for extracting parameters to be used for distinguishing the spoken words; a pattern matching portion for computing distance from standard word patterns to the spoken words responds to said parameters to determine the statistical distance between the spoken and standard patterns to obtain a signal having a value representing the combination of the minimum value of said distance and speech period (beginning and terminating ends of speech); and a structure analysis portion for detecting feature points indicative of the phoneme structure of each spoken word within said speech period and for determining what the spoken word is by computing the similarity of proposed and spoken words in accordance with the presence and absence of the featured points. With this arrangement, linear expansion/compression and pattern matching is repeated continuously on time base for obtaining distance, as well as the beginning and terminating ends of the words. As a result, detection of the speech periods is not required.

BRIEF DESCRIPTION OF THE DRAWINGS

The object and features of the present invention will become more readily apparent from the following detailed description of the preferred embodiments taken in conjunction with the accompanying drawings in which:

FIG. 8 is a functional block diagram of another embodiment of a speech recognition apparatus according to the present invention;

FIG. 9 is a functional block diagram of a pattern matching portion in the embodiment of FIG. 8;

The same or corresponding elements and parts are designated at like reference numerals throughout the drawings.

DETAILED DESCRIPTION OF THE INVENTION

Figure 1:
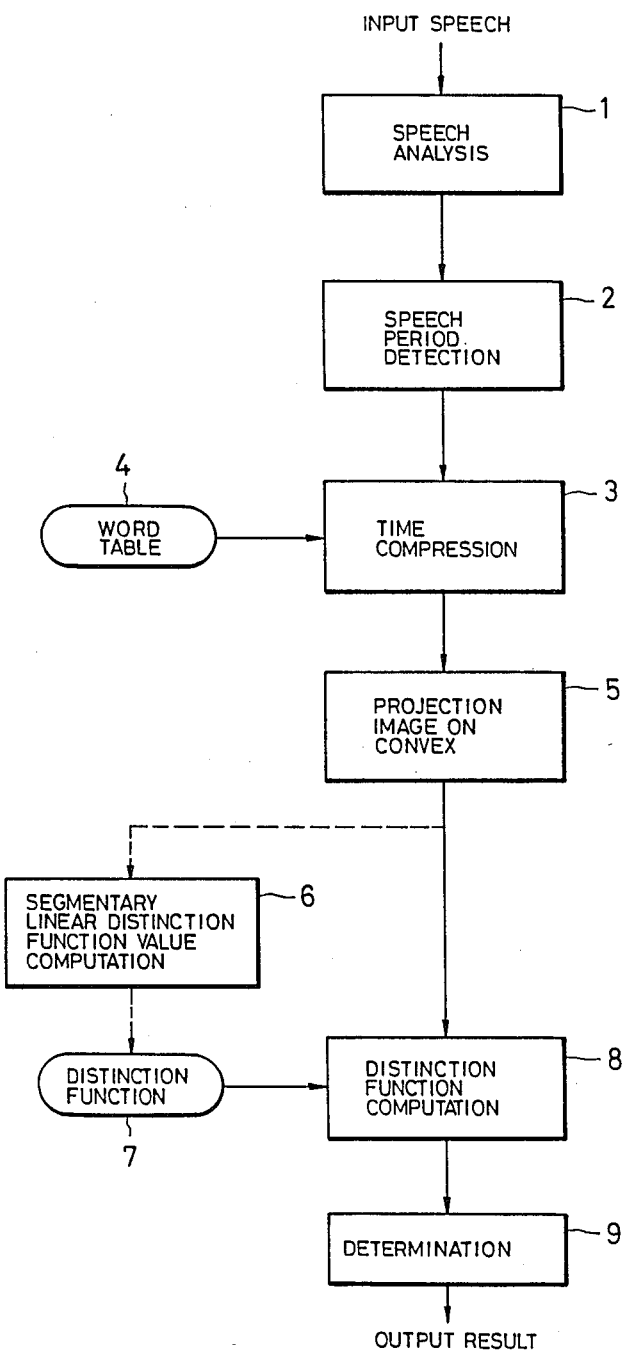
FIG. 1 is a functional block diagram of a conventional speech recognition apparatus.
Figure 2:
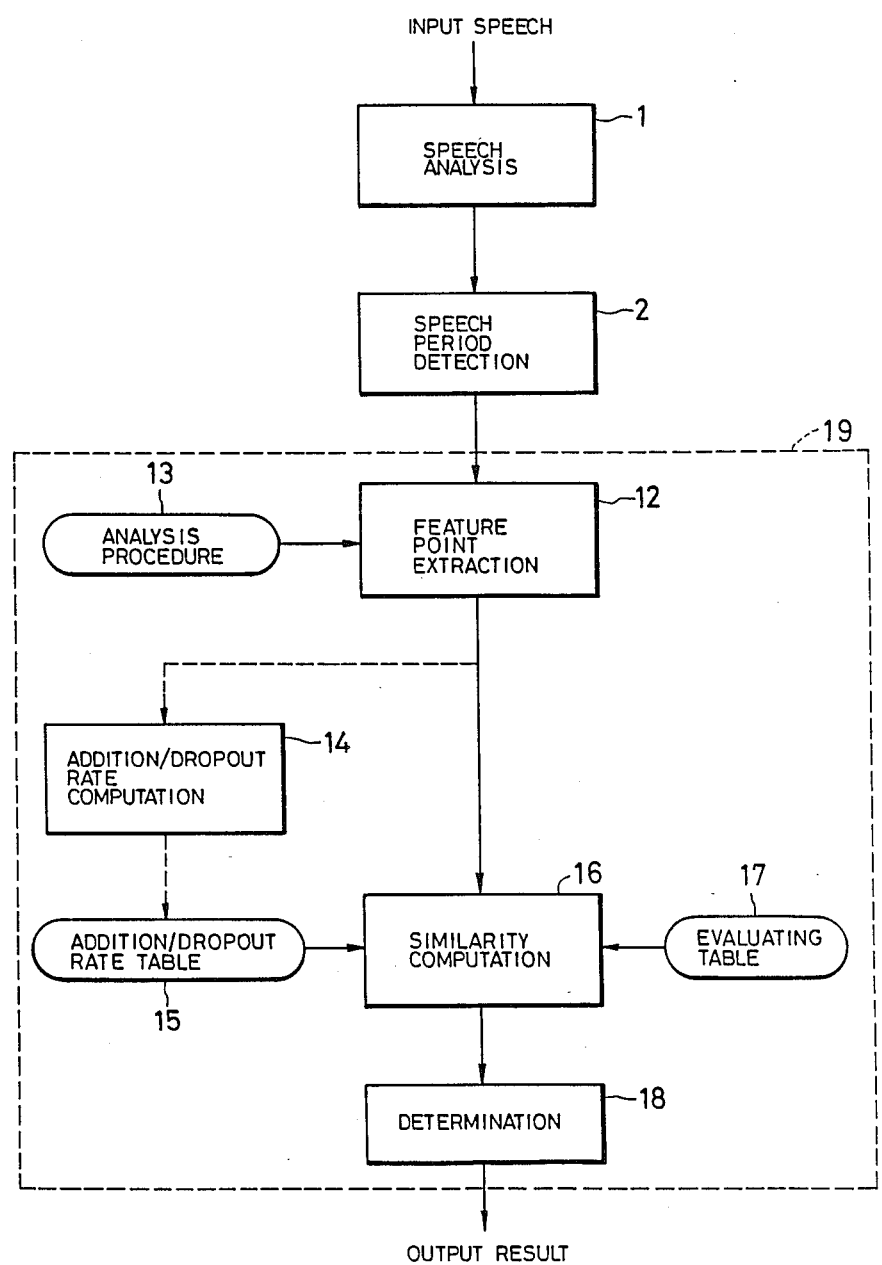
FIG. 2 is a functional block diagram of an embodiment of a speech recognition apparatus according to the present invention.

Reference is now made to FIG. 2, a functional block diagram of an embodiment of a speech recognition apparatus according to the present invention. An audio speech signal is A/D converted in a speech analyzing portion 1 at a sampling frequency of 8 kHz. Power levels are obtained in three frequency bands every 10 ms by using three band pass filters. The three bands include a low frequency band ranging from 150 to 600 Hz, a middle frequency band ranging from 600 to 1,500 Hz and a high frequency band ranging from 1,500 to 4,000 Hz.

Speech period detection is performed in response to the magnitude of the above-mentioned band power levels. In the case of inputs which are apt to suffer from noise, such as speech transmitted through a telephone line, speech period might be detected erroneously. To reduce such erroneous detection it is preferable to extract plural sets of proposed speech periods. On the other hand, when an input speech signal includes no noise, a determination may be made with only one set of speech periods.

Figure 3:
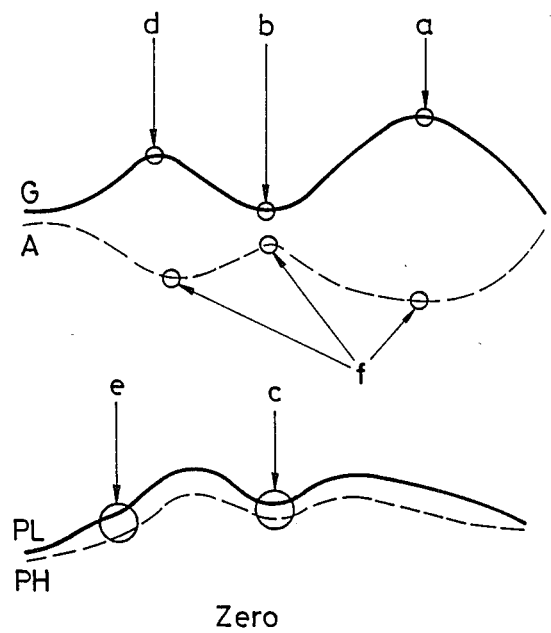
FIG. 3 is a diagram of a time-dependent variable used in describing the analyzing procedure for the structure of a word in accordance with the invention.

An output from the speech period detection portion 2 is applied to a structure analyzing portion 19 that includes feature extraction portion 12, similarity computation portion 16, determination portion 18 and other portions associated with them. The other portions include an analyzing procedure portion 13, an addition/dropout rate table 15, and an evaluating portion 17 which store previously prepared data using a plurality of samples. The analyzing procedure portion 13 stores procedures for analyzing the structure of respective words. This is further described taking as an example the word (zero) with reference to FIG. 3. Four patterns are to be used. In FIG. 3, the waveform G indicates a curved parameter which can be obtained from the following formula using band power levels:

$$G = 2P_M - P_H - P_L \ldots \quad (2)$$

where $P_M$, $P_H$ and $P_L$ are respectively the power levels in the medium, high and low frequency bands. Parameter G has a characteristic such that the parameter has a large magnitude for rear-tang vowels such as "a", "o", and "u" and a small magnitude for front-tang vowels such as "i" and "e". Waveform A is a parameter indicative of the slope of spectrum and is given by:

$$A = P_H - P_L$$

Parameter A has a characteristic such that it has a large value for unvoiced sounds and short values for nasal sounds as well as /u/.

Four parameters G, A, $P_L$ and $P_H$ for a word, (zero) vary as a function of time as shown in FIG. 3. The analysis procedure of the invention is such that a characteristic phoneme structure, which can be securely obtained, is determined first. First of all, maximum peak "a" of waveform "G", formed at the position of /o/, is detected. Since the minimum value "b" and the local peak "d" exist in front of "a", the entire brief structure is determined by these values. At the same time, a dip "c" of $P_L$ and $P_H$ is formed around "b". This dip, corresponding to /r/, has a short duration. Power dip "e" at the beginning of a word, which often occurs immediately before "d", is detected. Finally, the peaks and dip "f" of waveform "A" are detected to determine the structure of a word (zero) of the audio speech signal.

The above mentioned analysis is performed in advance for each of the words to be detected. Signals representing these values are stored in analysis procedure portion 13.

Feature points to be obtained are arbitrary and are determined by the type of word to be recognized. Only some feature points which are necessary to represent the structure of a particular word are detected. Feature points are not forcibly detected so the same number thereof is not detected in every word as in the conventional example.

Addition/dropout rate table 15 is now described. The feature points are extracted by the feature point extracting portion 12 in accordance with the analysis procedure from the analysis procedure portion 13. The extracted feature point data are transmitted to the addition/dropout rate computing portion 14 to accumulate an addition/dropout rate in response to the presence and absence of the feature points. In portion 14 the addition/dropout rate is summed for each of the points a,b, ... shown in FIG. 3. For instance, in the case of (zero), "c" in FIG. 3 does not necessarily exist, and may drop out. Therefore, the dropout probability of "c" is obtained in advance using a number of samples. The movement of parameters for the word (go) is similar to that for the word (zero); since movement corresponding to "c" of FIG. 3 sometimes appears, an additional possibility is also obtained. Such processing is made for each of the points to store the results thereof in the addition/dropout table 15.

Evaluating table 17 is now described. A similarity computing portion 16 computes the similarity for every pair of words to be recognized in accordance with the addition/dropout table 15 after the structural analysis. The purpose of this similarity computation for every pair of words is to improve the sharpness of determination. To this end, the evaluating table 17 is employed. For instance, in the words (zero) and (go), the difference is between the presence and absence of "b", "c" and "d" in the waveforms of FIG. 3. Therefore, instructions are written in the evaluating table 17 so as to pay attention to "b", "c" and "d" in a comparison of the words (zero) and (go). In this way, as the positions of the comparison are reduced and focused depending on the type of words, the accuracy in determination of what word has been spoken is improved.

The actual determination procedure is now described. The input speech signal is analyzed in the speech analyzing portion 1, and then speech period is detected in speech period detection portion 2. Then feature points are extracted by the feature point extracting portion 12 in accordance with an analysis procedure provided for each of the words in the analysis procedure portion 12. The similarity computing portion 16 computes similarity on the basis of values written in the addition/dropout rate table 15 at the evaluating points written in the evaluating table 17. The results of the similarity computation are fed to the determining portion 18 to remove one of the two words having lower similarity. This is repeated for every pair of words until a single word is finally left. Then the finally left single word is derived as the result of recognition.

In this embodiment, since the determination is repeated for every pair of words, the amount of processing becomes large as the number of used words increases. For instance, if the number of used words is 13, the determination portion 18 repeats the determination operation 12 times. However, since the results of computation portion 16 are subsequently repeated, the amount of processing does not increase linearly. In order to reduce the amount of processing which increases the number of use words, a method is adopted in which proposed words are reduced and focused by including a preliminary selecting portion before the feature extracting portion 12 of FIG. 2. If there are three words to be detected, determination operation 18 is only performed twice; this is effective for reducing the amount of processing. This point is described in detail infra.

The results for recognizing 13 words in the Japanese language, i.e., 10 numerals and words (hai), (iie) and (owari), spoken by 220 persons and transmitted through a telephone line is shown as a confusion matrix in Table I.

TABLE 1

| Inputted Word Number | RECOGNIZED WORD NUMBER | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | TOT |
| 1 | 201 | 2 | 0 | 1 | 0 | 2 | 0 | 1 | 0 | 0 | 0 | 0 | 0 | 207 |
| 2 | 0 | 209 | 0 | 0 | 3 | 0 | 0 | 0 | 0 | 0 | 0 | 0 | 0 | 212 |
| 3 | 0 | 0 | 203 | 2 | 1 | 1 | 1 | 0 | 3 | 0 | 3 | 0 | 0 | 214 |
| 4 | 0 | 2 | 2 | 204 | 1 | 0 | 0 | 0 | 0 | 0 | 0 | 0 | 0 | 209 |
| 5 | 0 | 0 | 1 | 4 | 211 | 0 | 0 | 0 | 0 | 1 | 0 | 0 | 0 | 217 |
| 6 | 4 | 0 | 1 | 0 | 2 | 205 | 2 | 2 | 0 | 1 | 0 | 0 | 0 | 217 |
| 7 | 0 | 1 | 0 | 1 | 0 | 0 | 211 | 0 | 0 | 4 | 0 | 1 | 0 | 218 |
| 8 | 2 | 0 | 0 | 0 | 0 | 1 | 0 | 208 | 0 | 0 | 3 | 0 | 0 | 214 |
| 9 | 0 | 0 | 1 | 1 | 0 | 0 | 0 | 0 | 211 | 3 | 0 | 2 | 0 | 218 |
| 10 | 0 | 0 | 1 | 0 | 2 | 0 | 2 | 0 | 2 | 211 | 0 | 1 | 0 | 219 |
| 11 | 0 | 1 | 9 | 0 | 0 | 0 | 0 | 0 | 1 | 0 | 206 | 0 | 0 | 217 |
| 12 | 1 | 1 | 0 | 0 | 0 | 1 | 1 | 0 | 0 | 0 | 0 | 209 | 0 | 213 |
| 13 | 0 | 0 | 0 | 0 | 1 | 1 | 0 | 0 | 0 | 0 | 3 | 0 | 213 | 218 |

In Table I, word number 11 indicates (hai); 12, (iie) and 13 (owari). After the preliminary selection method according to the present embodiment is used, the final determination is obtained in response to an evaluation using spectral information. A high overall recognition rate of 96.7 percent resulted.

Figure 4:
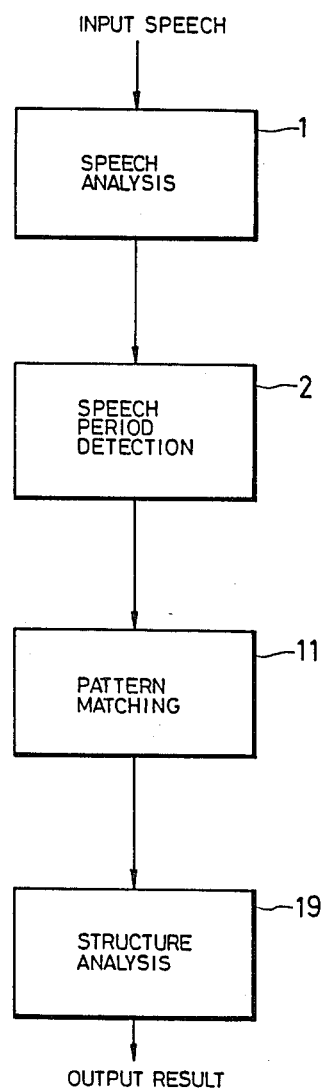
FIG. 4 is a functional block diagram of another embodiment of a speech recognition apparatus according to the present invention.

FIG. 4 is a functional block diagram of a second embodiment of the speech recognition apparatus according to the present invention. When speech is inputted, the speech analysis portion 1 analyzes the input speech such that parameters necessary for subsequent processing of the input speech are extracted. A proposed speech period is then extracted by the speech period extracting portion using extracted parameters.

Then proposed words are extracted by a pattern matching portion 11. The proposed words are combined with the above-mentioned proposed speech period to extract proposed words for each of the speech periods, and proposed words are reduced and focused to those having the greatest similarity to be outputted. A pattern matching method is used as a method of determining the time-dependent shape and spectrum shape of the entire speech. Then the structure of the speech is examined by the structure analysis portion 19 for the above-mentioned obtained proposed words to determine which stored word is most similar to the uttered word to derive a result representing a single word. A structure analysis method is used for detecting partial features of speech. By using both of these methods the drawbacks of the two methods are complemented by each other.

Figure 5:
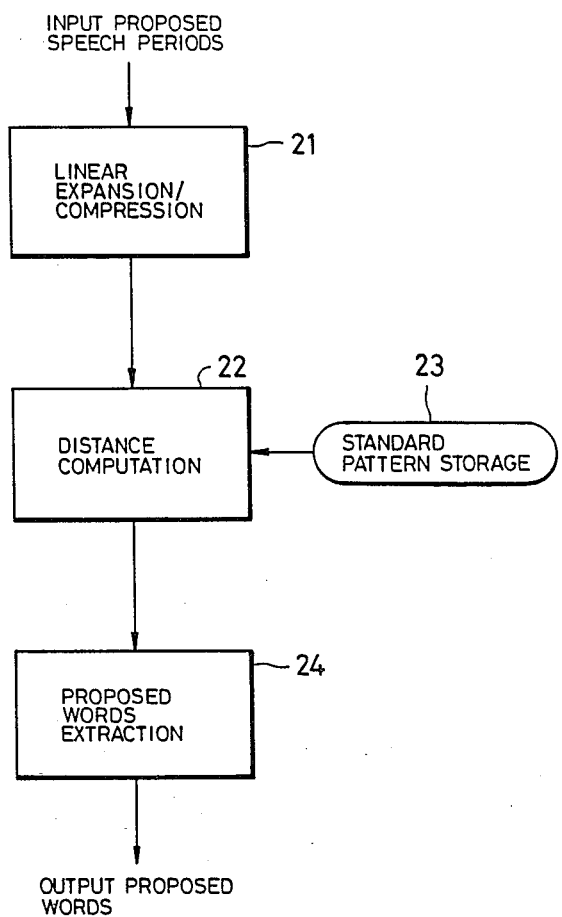
FIG. 5 is a functional block diagram of a pattern matching portion in the embodiment of FIG. 4.

FIG. 5 is a detailed functional diagram of the pattern matching portion 11 of FIG. 4. In response to speech period obtained by the speech period detecting portion 2 being supplied to portion 11, the time base is normalized within the speech period by a linear expansion/compression portion 21 to make the number of used frames constant. To force the length of words having a first frame length, J, to have a second frame length, I, the following linear expansion/compression formula is used.

$$i = \left[ \frac{I-1}{J-1} j + \frac{J-I}{I-1} + 0.5 \right] \quad (4)$$

wherein i is a frame number to be obtained.

The 0 to 5th order LPC cepstrum coefficients of the frame obtained by Eq. (4) are then arranged in time series to be an input X.

A distance computing portion 22 computes the distance between the input signal and the stored signals by responding to the output of portion and the contents of standard pattern storage 23. The distance is detected as a statistical distance measure. An approximation, Lk, of the input X at the *posteriori* time having a maximum probability P(wk|X) of being word Wk, is represented by:

$$Lk = Bk - Ak^t X \ldots \quad (5)$$

Figure 6:
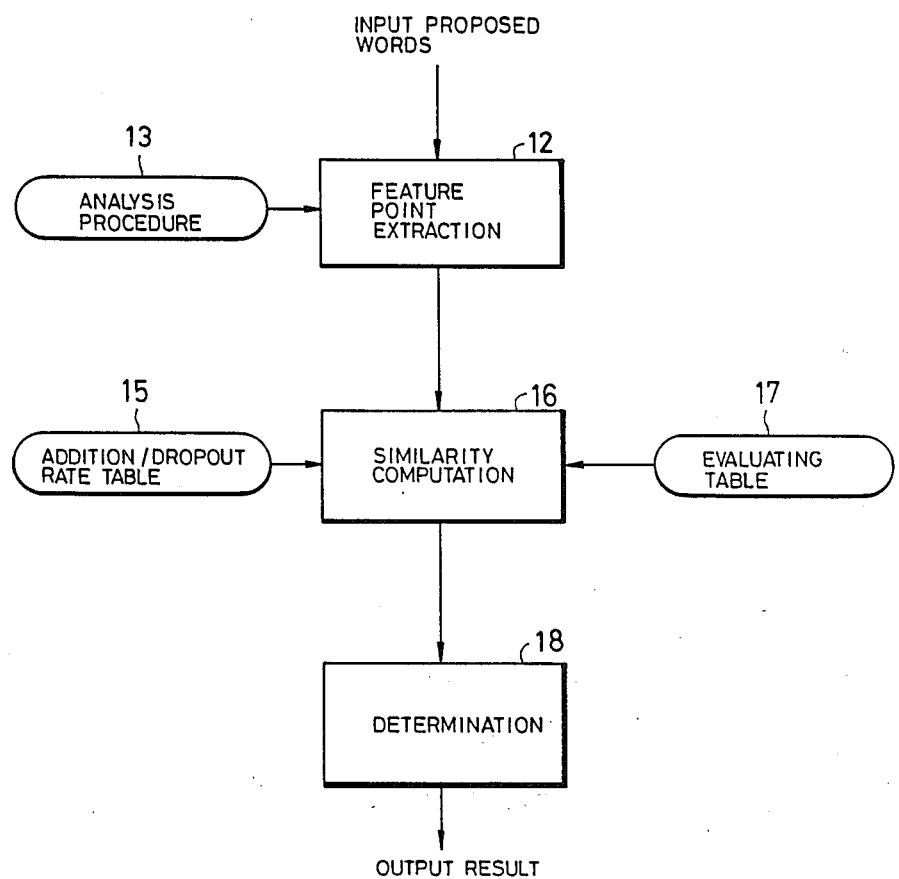
FIG. 6 is a functional block diagram of a structure analyzing portion in the embodiment of FIG. 4.

In the above, Bk and A $k^t$ correspond to standard patterns stored in storage 23 to compensate for an inaccurate speech period, Lk is obtained for each of words through computation of Eqs. (4) and (5) over several frames having a center position obtained by the speech period detecting portion 2. A proposed word extracting portion 24 outputs some of the words whose Lk are the smallest, as proposed words. The proposed words obtained by the proposed word extracting portion 24 are applied to structure analysis portion 19 having the same structure as that of FIG. 2. More specifically, as shown in FIG. 6, feature points are extracted by a feature point extracting portion 12 on the basis of the contents of the analysis procedure portion 13. To this end, analysis is performed to determine whether or not some feature points representing the structure of a word are present, assuming that the input speech is a given word within the proposed words. The presence or absence of feature points for respective words is transmitted as a result to the similarity computing portion 16. The similarity computing portion 16 computes similarity with reference to addition/dropout rate table 15 and evaluating table 17. The addition/dropout rate table 15 is prepared in advance by obtaining the presence and absence of feature points for respective words as an addition/dropout rate using the speech from several speakers. The evaluating table 17 is prepared beforehand by predetermining the types of features to be used for similarity computation effected for every pair of words. Similarity is obtained by reading the values of the addition/dropout rate table 15 on the basis of the presence and absence of feature points for respective words, and by adding the read values to each other. During this operation, it is determined whether a feature point is to be used for addition or not with reference to the evaluating table 17.

The result of the above-mentioned determination is transmitted to a determining portion 18, in which a determination is made for every pair of words such that a word having a lower similarity is erased; this procedure is repeated to finally output the single remaining word.

Figure 7:
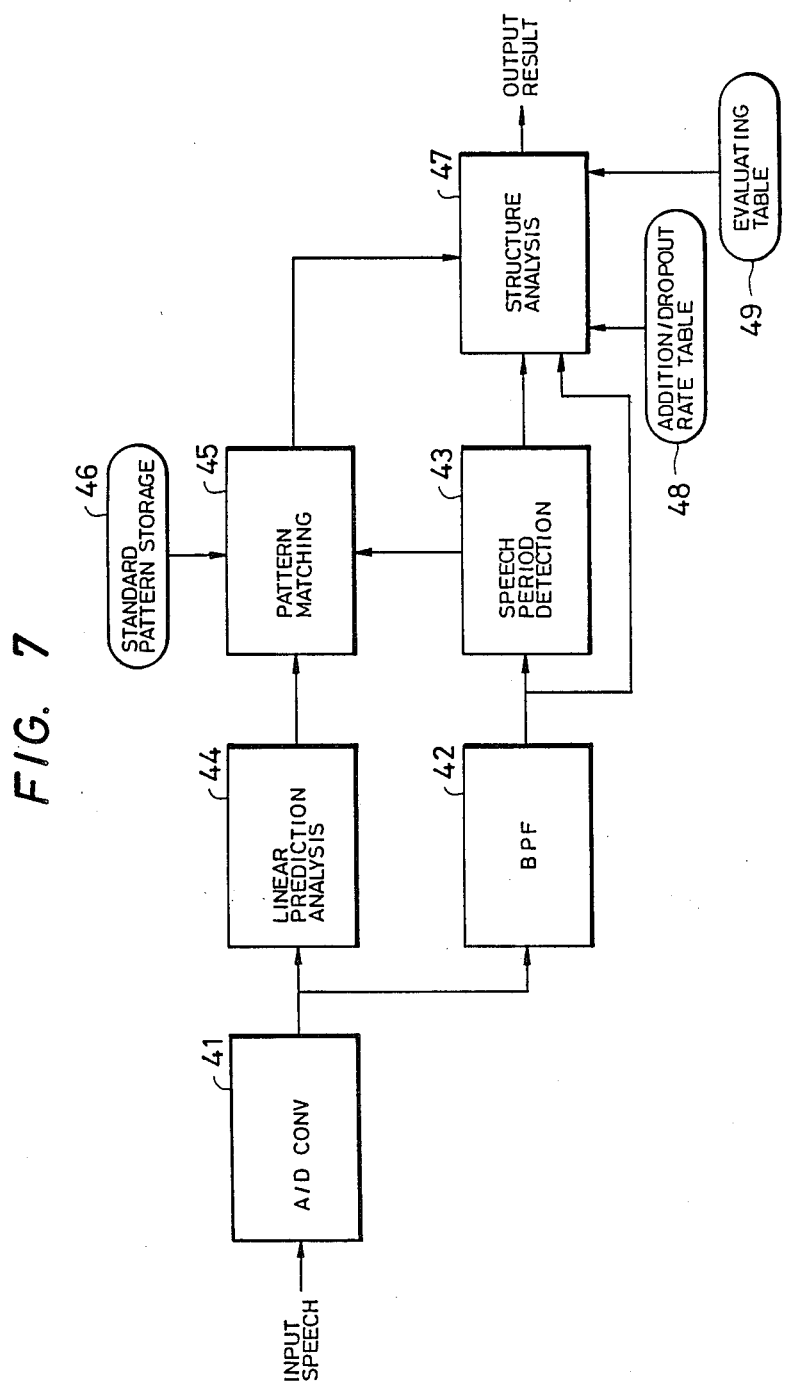
FIG. 7 is a block diagram of an entire speech recognition apparatus based on the embodiment of FIG. 4.

FIG. 7 is a functional block diagram of an entire speech recognition apparatus based on the arrangement of FIG. 4. An A/D conversion is performed on an input speech signal at a frequency of 8 kHz in A/D converting portion 41. Then a $10^{th}$ order linear prediction analysis is performed at intervals of 10 ms in a linear prediction analysis portion 44 to obtain 0 to $5^{th}$ order LPC cepstrum coefficients. In a band pass filter portion 42 responsive to the signal derived from A/D converting portion 4, are derived the power levels ($P_L$, $P_M$, $P_H$) in three frequency bands or channels, i.e. low frequency range from 150 to 600 Hz, middle frequency range from 600 to 1,500 Hz and high frequency range from 1,500 to 4,000 Hz. In response to the detected power levels in the three bands, a speech period detecting portion 43 responsive to band pass filter portion 42 extracts the periods having largest power level as proposed speech periods. In order to avoid ambiguity of the boundary due to unvoiced sounds or noise introduction, plural possible speech periods are extracted in portion 43 as the proposed periods. Pattern matching portion 45 responds to the signals from portions 43 and 44 and storage 46 to determine the distance for each of the words with respect to the proposed speech periods. The distance computation is performed using standard patterns stored in a standard pattern storage 46 on the basis of a statistical distance measure. As a result, several words having a large similarity are transmitted to structure analysis portion 47 as proposed words. The structure analysis portion 47 computes the similarity of the above-mentioned proposed words in response to the band power levels derived by the band pass filter portion 42 and the proposed speech periods obtained by the speech period detecting portion 43. The similarity computation is performed in response to signals stored in addition/dropout rate table 48 and an evaluating table 49. As a result, a signal associated with a single word is derived from the structure analysis portion 47.

In this embodiment, the speech period detecting portion 43 extracts a plural set of proposed speech periods to compensate for noise and variations in sound intensity of the input speech signal. The pattern matching portion 45 detects proposed words on the basis of a statistical distance measure to compensate for phoneme variations of different speakers. The pattern matching portion 45 detects the brief shape of the entire speech to reduce and focus on proposed words, while the structure analysis portion 47 captures local features of speech to assist in accurately determining a word. Furthermore, since the number of operations is small in both the pattern matching method and the structure analysis method, a compact speech analysis apparatus is attained at a low cost.

The speech recognition capability of the apparatus has been examined with experiments made with 330 unspecified speakers using a small number of words, i.e. 10 numerals from 0 to 9, using a city telephone line. An average recognition rate of 95.0 percent has been attained. The experiments have demonstrated that the apparatus of the present invention is stable for several varying factors including telephone line noise, variations amongst speakers and variations in the manner of sound emission.

FIG. 8 is a functional block diagram of another embodiment of a speech recognition apparatus according to the present invention. A speech analysis portion 1 analyzes input speech to extract parameters necessary for the following processing operations. A first parameter, indicative of the power of the speech signal in the three frequency bands, is obtained with a band pass filter analysis; a second parameter, indicative of the LPC cepstrum coefficients of the speech signal, is obtained with a linear prediction analysis. A pattern matching portion 11 responds to the first parameter to start computing distance by operating a speech switching portion described infra. The distance computation is performed in response to a standard pattern and the second parameter such that the speech switching portion is turned off when the distance value satisfies a given condition; this terminates processing by pattern matching portion 16. At this time, a combination of speech period and minimum distance is made for each output word. A structure analysis portion 19 reduces and focuses on proposed words using the output from the pattern matching portion 11, and then examines the structure of speech in the proposed speech periods. More specifically, a signal representing a single word is derived by computing which stored word is most similar to the input word using the first parameter.

While the pattern matching method is used for capturing the outline or brief shape of the entire speech, the structure and analysis method may be used for capturing local features of speech. These two methods are preferably combined to compensate for the drawbacks of each other, to provide overall recognition performance and stable operation.

The pattern matching portion 11 of FIG. 8 is described in detail with reference to FIG. 9. In response to input parameters, a speech switching portion 51 is actuated by the first parameter. When the band power magnitude, indicated by the first parameter, exceeds a threshold, a processing-start command "k" is supplied to a distance computing portion 53. At this time, a preprocessing portion 52 repeats linear expansion/compression and partial product computation, described infra., portion 52 stores the results of the computation. The partial product computation is effected with reference to the contents of a standard pattern storage 54. The speech switching portion 51 receives the result "l" from the distance computing portion 53 and derives termination command "m" when a minimum distance in the past is below a given threshold and when a lapse of time from the minimum distance point satisfies a given condition, causing the distance computing portion 53 to terminate distance computation. Finally, a minimum distance value and speech period, which are stored in the distance computing portion 53, are derived as a combination of each of the words.

The linear expansion/compression method is now described. The length of a speech period frame arbitrarily assumed to have a value J, may be normalized by adjusting the frame length I of a standard pattern. Using "j" for an input frame number, and "i" for a frame number to be obtained, "i" can be obtained using the aforementioned Eq. (4).

The distance computation method is now described. The distance of input X to word "k" is given by the aforementioned Eq. (5). The references A k and Bk correspond to the standard patterns of the word "k", and can be obtained by the following Eqs. (6) and (7):

$$Ak = 2(\mu k^t \cdot W^{-1} - \mu e^t \mu \cdot W^{-1}) \ldots (6)$$

$$Bk = \mu k^t \cdot W^{-1} \mu k - \mu e^t \cdot W^{-1} \mu e \ldots (7)$$

wherein $\mu k$ is an average vector of word "K", and $\mu e$ is an average vector of circumstance information. The term W is a covariance matrix common to the circumstance information, which can be obtained by the following equation:

$$W = (W_1 + W_2 + \ldots + W_k + \ldots + W_K + W_e)/(K+1). \tag{8}$$

wherein W k is a covariance matrix of word "k"; "K" is the number of words; and W e is a covariance matrix of circumstance information. A standard pattern of the circumstance information is produced by obtaining the running mean and covariance matrix, with the time series of the parameters being shifted by one frame one after another with respect to all periods (including speech periods and noise periods) using all samples.

The above-mentioned partial product is now described. Eq. (5) can be computed effectively by obtaining the partial products beforehand. Assuming parameter vectors of respective frames in an input vector X are given by x i (i = 1, 2, ...I):

$$X = (x\,1, x\,2, \ldots x\,i, \ldots, x\,I) \tag{9}$$

$$xi = (x1\,i, x2\,i, \ldots xd \cdot i, \ldots, xD \cdot i) \tag{10}$$

wherein D is the order number of an LPC cepstrum coefficient for each frame. Namely, X is a vector of $D \times I^{th}$ order.

A standard pattern A k of word "k" is also of $D \times I^{th}$ order, and can be expressed in a similar manner:

$$A\,k = (a\,1^k, a\,2^k, \ldots a\,i^k, \ldots, a\,I^k) \tag{11}$$

$$ai^k = (a1^k \cdot i, a2^k \cdot i, \ldots ad^k \cdot i, \ldots, aD^k \cdot i) \tag{12}$$

Using Eqs. (9) to (12), Eq. (5) can be developed as follows:

$$\begin{aligned} Lk &= Bk - A\,k^t \cdot X \\ &= Bk - \sum_{i=1}^{I} (a^{Ik})^t \cdot x\,i \\ &= Bk - \sum_{i=1}^{I} \left( \sum_{d=1}^{D} ad^k \cdot i \cdot xd \cdot i \right) \end{aligned} \tag{13}$$

From Eq. (13), Lk can be obtained as a term resulting from the addition of partial products over I frames. In addition, the beginning end and terminating end of speech, i.e. speech period, can be obtained at a position where Lk becomes a minimum. Eq. (13) is repeatedly solved with respect to K standard patterns; a combination of minimum distance and speech period is stored for each of the standard patterns.

Figure 10:
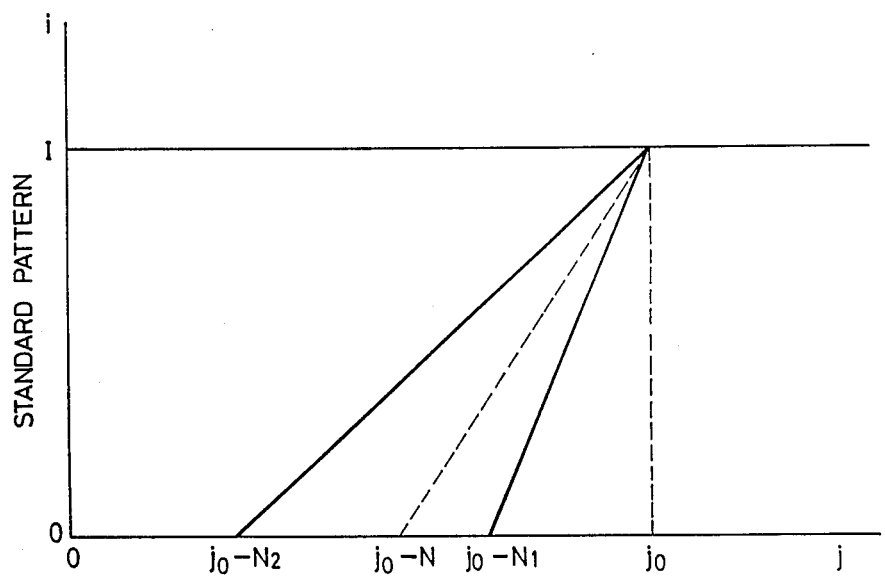
FIG. 10 is a diagram used for describing the expansion and compression of speech period length in the embodiment of FIG. 8.

In FIG. 10, the X axis is the time base of input speech and the Y axis is the time base of a standard pattern which is a correct solution. Consider the case where the axis of a terminating end is $j_o$ and the length of the speech period is N. The length of a speech period can be limited such that the maximum is N2 and minimum is N1 to reduce the amount of computation. More specifically, consider the case of the beginning end being within a range from $j_o-N2$ to $j_o-N1$. In this range, the expansion/compression of Eq. (1) is repeated to determine the distance computation of Eq. (13). The distance is a minimum when the beginning end is $j_o-N$, and a combination of distance value and speech period (beginning end of $j_o-N$, terminating end of $j_o$) is detected. This operation is repeated as $j_o$ is varied along the j axis, thereby successively renewing the minimum value and period.

Therefore, at the time when the speech switching portion 51 turns off, the production of a combination of minimum distance and speech period is completed; this combination is supplied to the structure analysis portion 19 of FIG. 8.

Figure 11:
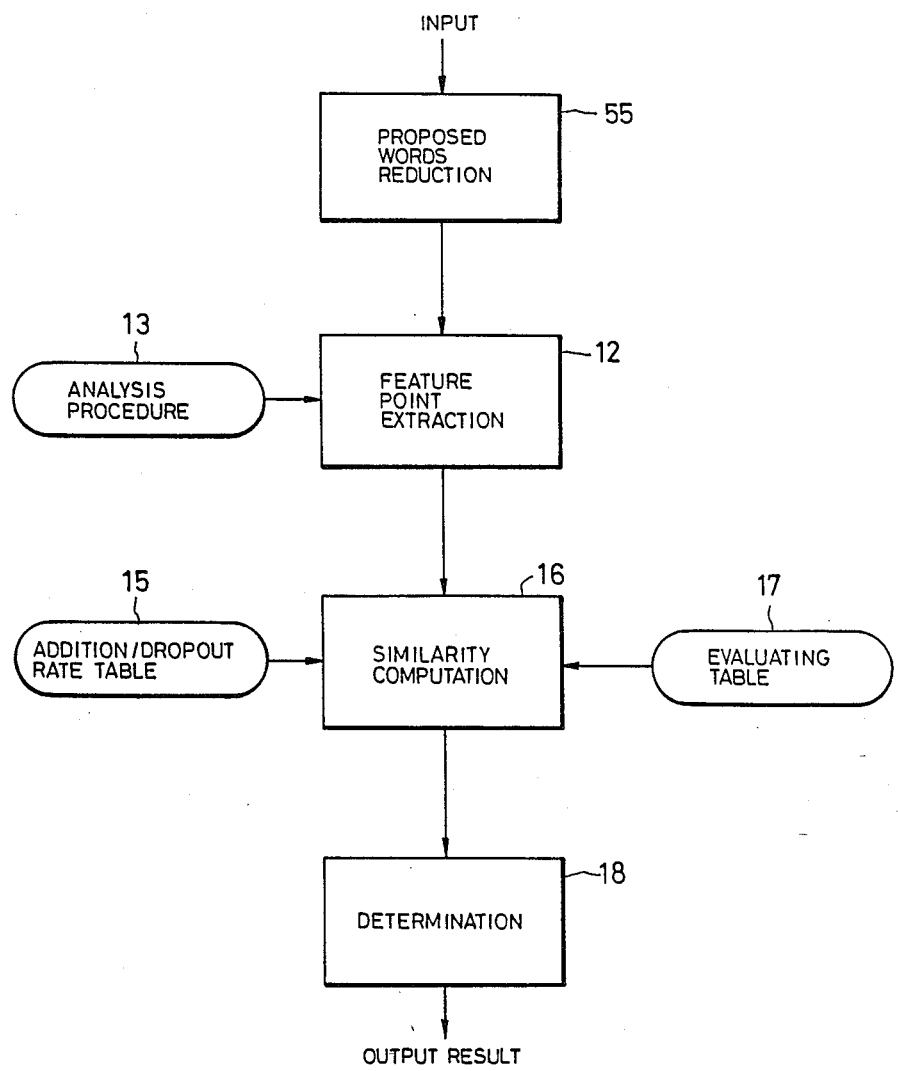
FIG. 11 is a functional block diagram of a structure analyzing portion in the embodiment of FIG. 8.

FIG. 11 is a functional block diagram of the structure analysis portion 19. FIG. 11 differs from FIG. 6 in that a proposed word reducing and focusing portion 55 is additionally provided; thus the description of the remaining portions is not repeated. The proposed word reducing and focusing portion 53 reduces the amount of processing by reducing the number of proposed words and proposed speech periods obtained by the distance computing portion 53.

Figure 12:
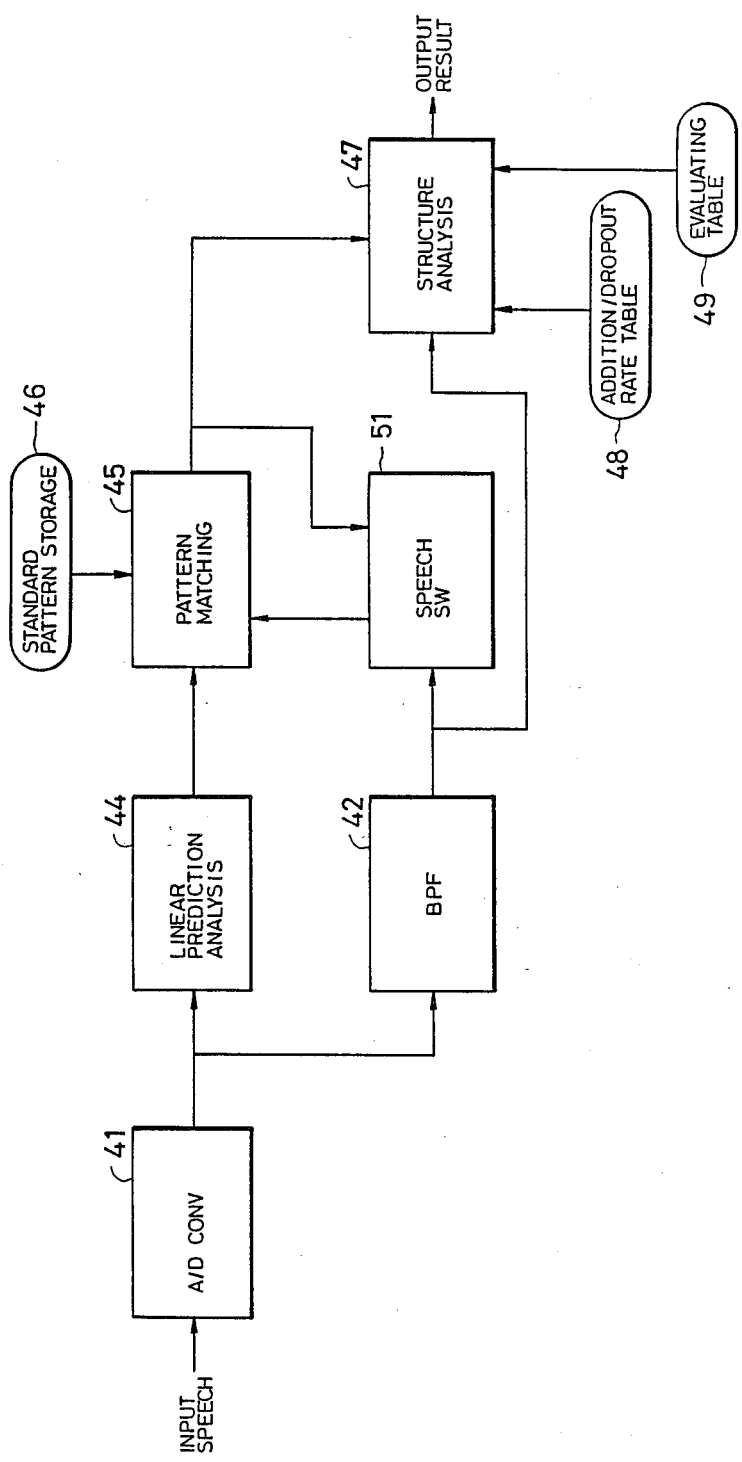
FIG. 12 is a block diagram of an entire speech recognition apparatus based on the embodiment of FIG. 8.

FIG. 12 is a functional block diagram of the entire speech recognition apparatus illustrated in FIG. 8. When a speech signal is supplied to the apparatus, A/D conversion is effected at 8 kHz in an A/D converting portion 41. Then $10^{th}$ order linear prediction analysis is effected at an interval of 10 ms in a linear prediction analysis portion 44 to obtain 0 to $5^{th}$ order LPC cepstrum coefficients. In a band pass filter portion 42 responsive to the output of A/D converting portion 15, there are derived band power levels ($P_L$, $P_M$, $P_H$) of three channels, i.e. low frequency range from 150 to 600 Hz, middle frequency range from 600 to 1,500 Hz and high frequency range from 1,500 to 4,000 Hz. In response to the determined band power levels a speech switching portion 51 responsive to the band pass filter portion 42 turns on when the band power exceeds a predetermined threshold. Portion 42 thus signals the pattern matching portion 45 that the speech was initiated. The pattern matching portion 45 continuously repeats the linear expansion/compression and distance computation in response to the contents of the standard pattern storage 46 on a time base to derive the minimum distance as well as the beginning and terminating ends corresponding to this instance. When the distance exceeds a predetermined threshold, the speech switching portion 43 turns off terminating pattern matching.

The structure analysis portion 47 reduces and focuses on proposed words and proposed speech periods using a combination of the minimum distance, beginning end and terminating end signals derived from the pattern matching portion 45. Then feature point extraction and similarity computation are performed for proposed words obtained by the band pass filter portion 42 using band power with respect to proposed speech periods. The similarity computation is effected using addition/dropout rate table 48 and evaluating table 49. As a result, a single word name is derived.

The recognition capability of the present embodiment is as follows. Evaluating data are ten numerals spoken by 330 speakers and recorded from a city telephone line. The recorded data include introduced noise and signal components having a poor S/N ratio. Table 2, contains the results of the evaluation.

TABLE 2

RESULT OF EVALUATION

| IN | OUT 1 | 2 | 3 | 4 | 5 | 6 | 7 | 8 | 9 | 10 | TOTAL |
|---|---|---|---|---|---|---|---|---|---|---|---|
| 1 | 301 (286) | 2 (8) | 0 | 0 | 0 | 1 | 1 | 3 | 5 (14) | 0 | 313 |
| 2 | 3 (0) | 312 (313) | 0 | 0 | 2 | 1 | 0 | 0 (1) | 0 (1) | 0 | 319 |
| 3 | 0 | 1 | 303 (302) | 4 | 7 | 1 | 0 (0) | 0 | 6 | 2 (3) | 324 |
| 4 | 0 | 3 | 8 | 286 (290) | 10 | 0 | 0 (0) | 0 | 0 | 4 (0) | 311 |
| 5 | 1 | 0 | 5 | 0 | 311 (306) | 5 | 0 (0) | 0 | 1 | 2 (7) | 325 |
| 6 | 0 | 0 | 2 | 1 | 3 | 313 | 1 | 4 | 0 | 1 | 325 |
| 7 | 0 | 0 | 2 (2) | 0 (2) | 0 (8) | 1 | 312 (306) | 1 | 0 | 9 (5) | 325 |
| 8 | 4 | 1 (6) | 4 | 0 | 0 | 0 | 1 | 313 (306) | 0 (2) | 0 | 323 |
| 9 | 1 (1) | 1 | 2 | 0 | 0 | 0 | 0 | 0 (0) | 319 (319) | 2 | 327 |
| 10 | 0 | 0 | 1 (1) | 7 (5) | 2 (32) | 0 | 3 (10) | 0 | 4 | 309 (274) | 326 |

In Table 2, input word numbers are vertically arranged, while recognized word numbers are horizontally arranged; the results are shown by the number of either recognized words or errors. In Table 2, each diagonal element indicates the number of correct solutions for each of the words. A high overall average recognition rate of 95.69 percent has been obtained. In Table 2, numerals in brackets indicate the number of recognized words or number of errors before the words are supplied to the structure analysis portion 47.

As described in detail above, by performing both speech period detection and pattern matching, speech period detection error can be remarkably suppressed. Furthermore, by using a statistical distance measure for pattern matching, the speech recognition apparatus can operate stably despite variations due to different speakers. Furthermore, by capturing local speech features by the structure analysis portion after the proposed words are reduced and focused with the outline of the entire speech being captured by the pattern matching portion, a final word determination is made more accurately. As a result, a high recognition rate is obtained. In this way the present invention has advantages of stable speech recognition for a small number of words spoken by unspecified speakers under varying conditions such as noise or variations in line or circuit conditions such as speech transmitted through a telephone line.

The above-described embodiments are just examples of the present invention, and therefore, it will be apparent for those skilled in the art that many modifications and variations may be made without departing from the scope of the present invention.

What is claimed is:

1. A speech recognition apparatus comprising:
   (a) a speech analysis portion for extracting parameters necessary for determining of spoken words;
   (b) a speech period detecting portion for extracting one or more combinations of speech periods using said parameters; and
   (c) a structure analysis portion responsive to said speech analysis portion and said speech period detecting portion for detecting feature points indicative of phoneme structure of each word using said parameters found within said detected speech periods and for determining a word through computation of similarity to predetermined proposed words in accordance with the presence and absence of the feature points, said structure analysis portion comprising:
   (i) an analysis procedure portion for indicating the procedure of automatically detecting feature points representative of phoneme structure for each word;
   (ii) an addition/dropout rate table made by obtaining an addition/dropout rate of said feature points from a number of samples;
   (iii) an evaluating table in which types of predetermined feature points necessary for determining a word are written for each of a plurality of predetermined words;
   (iv) a feature point extracting portion for extracting feature points from input speech in accordance with the contents of said analysis procedure portion;
   (v) a similarity computing portion for computing similarity of feature points necessary between objective words by detecting the presence/absence of feature points with reference to said evaluating table and said addition/dropout rate table; and
   (vi) a determining portion for determining words by using said similarity.

2. A speech recognition apparatus as claimed in claim 1, wherein said analysis procedure portion is arranged to set an arbitrarily number of feature points necessary depending on the sort of words.

3. A speech recognition apparatus as claimed in claim 1, wherein said speech analysis portion is arranged to output three channel band pass filter outputs.

4. A speech recognition apparatus as claimed in claim 1, further comprising a pattern matching portion for obtaining distance for each of words on the basis of posteriori probability using the extracted parameters.

5. A speech recognition apparatus comprising:
   (a) a speech analysis portion for extracting parameters to be used for distinguishing input speech;
   (b) a speech period detecting portion for extracting one or more combinations of speech periods using said parameters;
   (c) a pattern matching portion for reducing and focusing proposed words by obtaining distance for each of words on the basis of posteriori probability using said parameters, said pattern matching portion comprising:
   (a) a linear expansion/compression portion for converting parameters obtained by said speech analysis portion into second parameters through expansion/compression on time base;
   (b) a standard pattern storage for storing standard pattern of spoken words which are prepared in advance;
   (c) a standard computing portion for computing distance using said second parameters on the basis of a statistical distance measure; and
   (d) a proposed word extracting portion for determining proposed words; and
   (e) a structure analysis portion responsive to said speech analysis portion and said speech period detecting portion for detecting feature points indicative of phoneme structure of each word using said parameters found within said detected speech periods and for determining a word through computation of similarity to predetermined proposed words in accordance with the presence and absence of the feature points, said structure analysis portion comprising:
   (i) an analysis procedure portion for indicating the procedure for extracting feature points representing phoneme structure for each of plural words;
   (ii) a feature point extracting portion for extracting feature points in accordance with the analysis procedure;
   (iii) an addition/dropout rate table prepared by obtaining an addition/dropout rate of said feature points in advance;
   (iv) an evaluating table indicating the types of predetermined features to be used for distinguishing between predetermined words;
   (v) a similarity computing portion; and
   (vi) a determining portion;
   said feature point extracting portion extracting feature points in accordance with said analysis procedure portion with respect to proposed words obtained from said proposed word extracting a portion forming said pattern matching portion; said similarity computing portion computing similarity to said proposed words using said addition/dropout rate table and said evaluating table; and said determining portion determining words using said similarity.

6. A speech recognition apparatus as claimed in claim 5, wherein said analysis procedure portion is arranged to set an arbitrarily number of feature points necessary depending on the sort of words.

7. A speech recognition apparatus as claimed in claim 5, wherein said speech analysis portion is arranged to output three channel band pass filter outputs.

8. A speech recognition apparatus comprising:
   (a) a speech analysis portion for extracting parameters to be used for distinguishing speech;
   (b) a pattern matching portion for computing distance from a word standard pattern using said parameters on the basis of a statistical distance measure and for obtaining a combination of minimum value of said distance and speech period formed of beginning and terminating ends of speech; and (c) a structure analysis portion responsive to said speech analysis portion for detecting feature points indicative of phoneme structure of each word within said speech period and for determining a word through computation of similarity to predetermined proposed words in accordance with the presence and absence of the feature points, said structure analysis portion comprising:
  (i) an analysis procedure portion for indicating the procedure for extracting feature points representing phoneme structure for each of plural words;
  (ii) a feature point extracting portion for extracting feature points in accordance with the analysis procedure;
  (iii) an addition/dropout rate table prepared by obtaining addition/dropout rate of said feature points in advance;
  (iv) an evaluating table indicating the types of predetermined features to be used for distinguishing between predetermined words;
  (v) a similarity computing portion; and
  (vi) a determining portion;
said feature point extracting portion extracting feature points in accordance with said analysis procedure portion with respect to proposed words; said similarly computing portion computing similarity to said proposed words using said addition/dropout rate table and said evaluating table; and said determining portion determining words using said similarity.

9. A speech recognition apparatus as claimed in claim 8, wherein said pattern matching portion comprises:
  (a) a switching portion for applying command for starting distance computation using parameters obtained in said speech analysis portion, and for applying command for terminating distance computation using distance value obtained by said distance computation;
  (b) a standard pattern storage for storing word standard patterns prepared in advance;
  (c) a preprocessing portion for obtaining partial product of distance values on the basis of statistical distance measure using the contents of said standard pattern storage after said parameters obtained by said speech analysis portion are converted through linear expansion/compression on time base; and
  (d) a distance computing portion for computing distance using said partial product and said contents of said standard pattern storage and for renewing and holding speech period corresponding to minimum distance.

10. A speech recognition apparatus as claimed in claim 8, wherein said analysis procedure portion is arranged to set an arbitrarily number of feature points necessary depending on the sort of words.

11. A speech recognition apparatus as claimed in claim 8, wherein said speech analysis portion is arranged to output three channel band pass filter outputs.

* * * * *